United States Patent
Wu

(10) Patent No.: US 9,383,665 B2
(45) Date of Patent: *Jul. 5, 2016

(54) AMMONIUM ALKYLPHOSPHATE CONTAINING INTERMEDIATE TRANSFER MEMBERS

(71) Applicant: Xerox Corporation, Norwalk, CT (US)

(72) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 687 days.

This patent is subject to a terminal disclaimer.

(21) Appl. No.: 13/761,128

(22) Filed: Feb. 6, 2013

(65) Prior Publication Data

US 2013/0149639 A1   Jun. 13, 2013

Related U.S. Application Data

(63) Continuation of application No. 13/178,056, filed on Jul. 7, 2011, now Pat. No. 8,409,719.

(51) Int. Cl.
| | |
|---|---|
| C08L 79/08 | (2006.01) |
| C08K 5/521 | (2006.01) |
| C08K 3/04 | (2006.01) |
| G03G 5/06 | (2006.01) |
| G03G 15/16 | (2006.01) |
| H01B 1/24 | (2006.01) |
| C08G 73/14 | (2006.01) |
| C08K 5/19 | (2006.01) |
| C08G 77/445 | (2006.01) |
| C08G 77/46 | (2006.01) |

(52) U.S. Cl.
CPC ............. *G03G 5/0661* (2013.01); *C08G 73/14* (2013.01); *C08K 5/521* (2013.01); *C08L 79/08* (2013.01); *G03G 15/162* (2013.01); *H01B 1/24* (2013.01); *C08G 77/445* (2013.01); *C08G 77/46* (2013.01); *C08K 5/19* (2013.01); *C08K 2201/001* (2013.01); *Y10T 428/3154* (2015.04); *Y10T 428/31544* (2015.04); *Y10T 428/31663* (2015.04); *Y10T 428/31721* (2015.04)

(58) Field of Classification Search
CPC ......... C08L 79/08; C08L 83/04; C08G 73/14; C08K 5/521; C08K 5/5205; G03G 15/162; G03G 5/0061; H01B 1/24; Y10T 428/31721; Y10T 428/3154; Y10T 428/31544; Y10T 428/31663

See application file for complete search history.

(56) References Cited

U.S. PATENT DOCUMENTS

| | | |
|---|---|---|
| 2,563,506 A | 8/1951 | Werntz |
| 3,364,192 A | 1/1968 | Leach |
| 3,691,136 A | 9/1972 | Serres et al. |
| 4,727,177 A | 2/1988 | Saiki et al. |
| 5,978,639 A | 11/1999 | Masuda et al. |
| 6,139,784 A | 10/2000 | Oshima et al. |
| 6,397,034 B1 | 5/2002 | Tarnawskyj et al. |
| 6,738,595 B2 | 5/2004 | Hsieh et al. |
| 7,031,647 B2 | 4/2006 | Mishra et al. |
| 7,130,569 B2 | 10/2006 | Goodman et al. |
| 7,139,519 B2 | 11/2006 | Darcy, III et al. |
| 7,542,713 B2 | 6/2009 | Yoshida |
| 7,781,133 B2 | 8/2010 | Wu et al. |
| 8,409,719 B2 * | 4/2013 | Wu .................. G03G 15/162 428/421 |
| 2004/0115556 A1 | 6/2004 | Nakamura |
| 2005/0196202 A1 | 9/2005 | Suzuki et al. |
| 2010/0330305 A1 | 12/2010 | Wu |
| 2011/0052854 A1 | 3/2011 | Wu et al. |

FOREIGN PATENT DOCUMENTS

JP            07300527 A      11/1995

* cited by examiner

*Primary Examiner* — Callie Shosho
*Assistant Examiner* — John Freeman
(74) *Attorney, Agent, or Firm* — Eugene O. Palazzo

(57) ABSTRACT

An intermediate transfer member that includes a mixture of a polyamideimide, an ammonium alkylphosphate, an optional polysiloxane, and an optional conductive filler.

15 Claims, 1 Drawing Sheet

AMMONIUM ALKYLPHOSPHATE CONTAINING INTERMEDIATE TRANSFER MEMBERS

This application is a continuation of application Ser. No. 13/178,056, filed Jul. 7, 2011, U.S. Pat. No. 8,409,719 the disclosure of the application being totally incorporated herein by reference. Also, the filing date or priority date of Jul. 7, 2011 for the application Ser. No. 13/178,056 now U.S. Pat. No. 8,409,719 is hereby claimed for the common subject matter contained in the present continuation application.

This disclosure is generally directed to ammonium alkylphosphate containing intermediate transfer members, and to an intermediate transfer member that includes a mixture of a polyamideimide, an ammonium alkylphosphate, an optional polysiloxane, and an optional conductive component.

BACKGROUND

Intermediate transfer members, such as intermediate transfer belts selected for receiving and then transferring a developed image in xerographic systems, are known. For example, there are known intermediate transfer members that include thermosetting polymers such as polyimides. Intermediate transfer members made of thermosetting polyimides are particularly selected for use in high end xerographic machines and printers that generate at least 30 pages per minute, and up to 100 pages per minute or more. Thermosetting polyimides are primarily selected because of their acceptable modulus of about 3,500 Mega Pascals. However, intermediate transfer members using these materials are uneconomical in that both the raw material cost and the manufacturing process cost are higher than when using a number of other known materials.

A disadvantage relating to the preparation of an intermediate transfer member is that there is usually deposited a separate release layer on a metal substrate. Thereafter, there is applied to the release layer the intermediate transfer member components, and where the release layer allows the components to be separated from the member by peeling or by the use of mechanical devices. The intermediate transfer member can be in the form of a film, which can be selected for xerographic imaging systems, or the film can be deposited on a supporting substrate like a polymer layer. The use of a release layer adds to the cost and time of preparation, and such a layer can modify a number of the intermediate transfer member characteristics.

Also, known are intermediate transfer members containing phosphate esters, and which members possess self release characteristics from metal substrates. However, while initially effective, the stored coating solution mixtures for such members degrade gradually over short time periods, thereby rendering them ineffective for suitable self releasing intermediate transfer member films from metal substrates.

Thus, an economical intermediate transfer member possessing high modulus and excellent release characteristics for high end machines is desired.

There is a need for intermediate transfer members that substantially avoid or minimize the disadvantages of a number of known intermediate transfer members.

Further, there is a need for intermediate transfer member coating solutions that retain a substantially consistent stability, and that are free of a gradual degradation or with no or minimal degradation for extended time periods, such as from about 1 day to about 2 years.

Additionally, there is a need for intermediate transfer member materials that possess self release characteristics from a number of substrates that are selected when such members are prepared.

Another need relates to intermediate transfer members that have excellent conductivity or resistivity, that possess a high modulus, and acceptable break strengths, and that resist curling and remain in a flat orientation.

These and other needs are achievable in embodiments with the intermediate transfer members and components thereof disclosed herein.

SUMMARY

Disclosed is an intermediate transfer member comprising a polyamideimide polymer and an ammonium alkylphosphate.

Further disclosed is an intermediate transfer member comprising a mixture of a polyamideimide polymer, an ammonium alkylphosphate, a polysiloxane, and an optional conductive filler component, and wherein the ammonium alkylphosphate is represented by the following formulas/structures

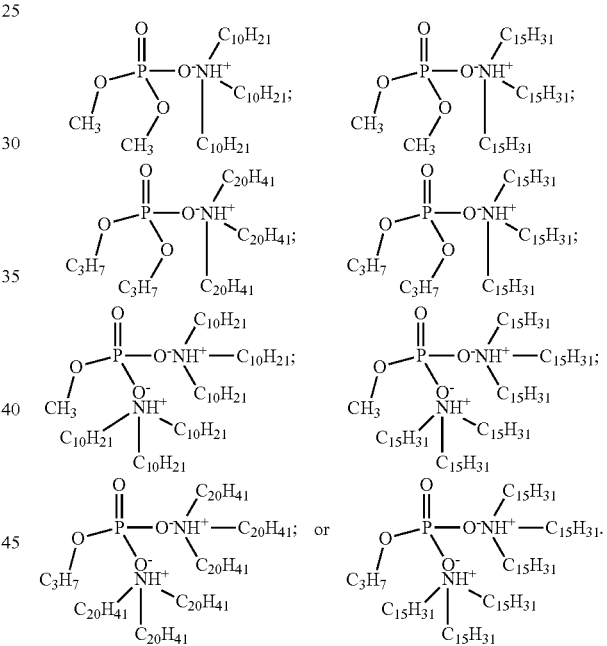

Also disclosed is an intermediate transfer member comprising a cured mixture of a polyamideimide polymer, an ammonium alkylphosphate, an optional polysiloxane, and an optional conductive filler, and wherein the mixture prior to curing is substantially free of degradation for extended time periods.

FIGURES

The following Figures are provided to further illustrate the intermediate transfer members disclosed herein.

EMBODIMENTS

There is provided herein an intermediate transfer member comprising a polyamideimide, an ammonium alkylphosphate, an optional polysiloxane, and an optional conductive component or filler. A mixture of the polyamideimide, and an ammonium alkylphosphate, which mixture may also contain a polysiloxane, and a conductive filler, is stable with minimum or no degradation for up to about 2 years and enables self release from substrates like metal substrates, such as stainless steel, thereby avoiding the need for a separate release layer on the substrate.

Figure 1:
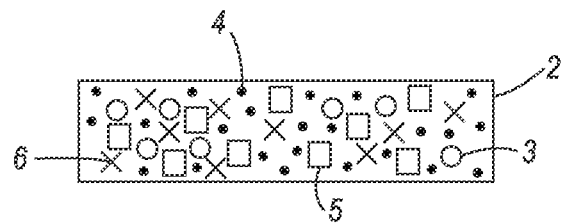
FIG. 1 illustrates an exemplary embodiment of a one layer intermediate transfer member of the present disclosure.

In FIG. 1, there is illustrated an intermediate transfer member comprising a layer 2 comprised of a mixture of a polyamideimide 3, an ammonium alkylphosphate 4, an optional siloxane polymer 5, and an optional conductive component 6.

Figure 2:
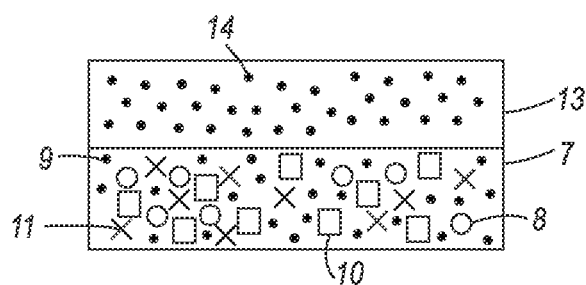
FIG. 2 illustrates an exemplary embodiment of a two layer intermediate transfer member of the present disclosure.

In FIG. 2, there is illustrated a two-layer intermediate transfer member comprising a bottom layer 7 comprising a mixture of a polyamideimide 8, an ammonium alkylphosphate 9, an optional siloxane polymer 10, and an optional conductive component 11, and an optional top or outer toner release layer 13 comprising release components 14.

Figure 3:
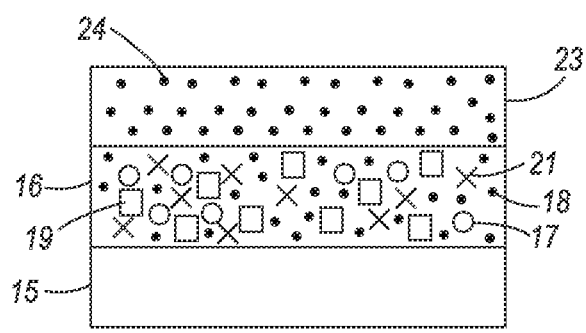
FIG. 3 illustrates an exemplary embodiment of a three layer intermediate transfer member of the present disclosure.

In FIG. 3, there is illustrated a three-layer intermediate transfer member comprising a supporting substrate 15, a layer thereover 16 comprising a mixture of a polyamideimide 17, an ammonium alkylphosphate 18, an optional siloxane polymer 19, and an optional conductive component 21, and an optional release layer 23 comprising release components 24.

There are disclosed self-releasing intermediate transfer member stable coating solutions with a high Young's modulus of, for example, exceeding about 4,000 Mega Pascals (MPa), suitable resistivities, excellent coefficient of thermal expansions of, for example, from about 20 to about 70, from about 20 to about 50, from about 25 to about 40, or from about 30 to about 45 ppm/° K (parts per million per degree Kelvin), and smooth high quality surfaces.

The intermediate transfer members disclosed herein have self-release characteristics, and where the use of an external release layer present on, for example, a stainless steel substrate is avoided; have excellent mechanical strength while permitting the rapid and complete transfer of from about 90 to about 99 percent, or from about 95 to about 100 percent transfer, of a xerographic developed image; possess a Young's modulus of, for example, from about 4,000 to about 7,000 Mega Pascals (MPa), from about 5,000 to about 6,500 MPa, or from about 4,800 to about 5,500 MPa; have a high glass transition temperature ($T_g$) of from about 200° C. to about 400° C., or from about 275° C. to about 350° C.; a CTE (coefficient of thermal expansion) as determined by Thermo-Mechanical Analysis of from about 20 to about 70 parts per million per degree Kelvin (ppm/° K), or from about 30 to about 60 ppm/° K; and an excellent resistivity as measured with a known High Resistivity Meter of, for example, from about $10^8$ to about $10^{13}$ ohm/square, from about $10^9$ to about $10^{13}$ ohm/square, from about $10^9$ to about $10^{12}$ ohm/square, or from about $10^{10}$ to about $10^{12}$ ohm/square. Furthermore, the coating solution mixtures selected for the formation of the intermediate transfer member films are stable with no changes in their properties when being stored for up to 2 years.

Self-release characteristics without the assistance of any external sources, such as prying devices, permit the efficient, economical formation and full separation, from about 95 to about 100 percent, or from about 97 to about 99 percent, of the disclosed intermediate transfer member films from substrates, such as steel, upon which the members are initially prepared, and where release materials and separate release layers can be avoided on the metal substrates. The time period to obtain the self-release characteristics varies depending, for example, on the components selected for the intermediate transfer mixtures disclosed. Generally, however, for the disclosed intermediate transfer members the self-release time period is from about 1 to about 60 seconds, from about 1 to about 35 seconds, from about 1 to about 10 seconds, or from 1 to about 5 seconds, and in some instances less than about 1 second.

The intermediate transfer members of the present disclosure can be provided in any of a variety of configurations, such as a one-layer configuration, or in a multi-layer configuration including, for example, a top release layer. More specifically, the disclosed intermediate transfer member may be in the form of an endless flexible belt, a web, a flexible drum or roller, a rigid roller or cylinder, a sheet, a drelt (a cross between a drum and a belt), a seamless belt, that is with an absence of any seams or visible joints in the members, and the like.

Polyamideimide Polymers

The intermediate transfer members herein comprise a polymer layer comprising a polyamideimide polymer with an ammonium alkylphosphate mixed or dispersed therein. Any suitable polyamideimide polymer can be used in embodiments, and can be used alone, in mixtures of two or more, or in a mixture with other polymeric binder materials. In embodiments, the polyamideimide polymer can be, for example, a polymer, a copolymer, a terpolymer, higher-order polymers, or the like.

Polyamideimide examples selected for the disclosed intermediate transfer member mixtures include, for example, those components like polymers represented by the following structures/formulas

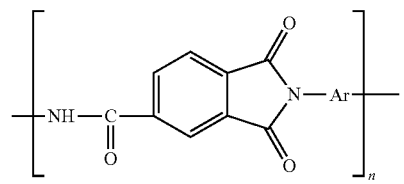

and which components are available from Toyobo Company, Japan, where n represents the number of repeating segments of, for example, a number of from about 20 to about 1,000, from about 50 to about 750, from about 125 to about 500, from about 150 to about 400, from about 200 to about 600, from about 100 to about 700, from about 500 to about 700, from about 100 to about 500, or from about 275 to about 400, and Ar is aryl with, for example, from about 6 to about 36 carbon atoms, from about 6 to about 24 carbon atoms, from about 6 to about 18 carbon atoms, from about 6 to about 12 carbon atoms, or 6 carbon atoms, such as phenyl, napthyl, anthryl, or substituted derivatives thereof where the substituents are alkyl groups.

The number average molecular weight of the polyamideimide selected for the disclosed intermediate transfer member mixtures is, for example, from about 5,000 to about 50,000, from about 10,000 to about 25,000, from about 15,000 to about 35,000, or from about 7,000 to about 20,000, with the weight average molecular weight of the polyamideimide being, for example from about 10,000 to about 200,000, from about 50,000 to about 325,000, from about 100,000 to about 300,000, or from about 30,000 to about 100,000. Both the number average and weight average molecular weights of the polyamideimide are determined by known methods, such as GPC analysis.

Specific polyamideimide examples incorporated into the disclosed mixtures can be represented by at least one of the following formulas/structures

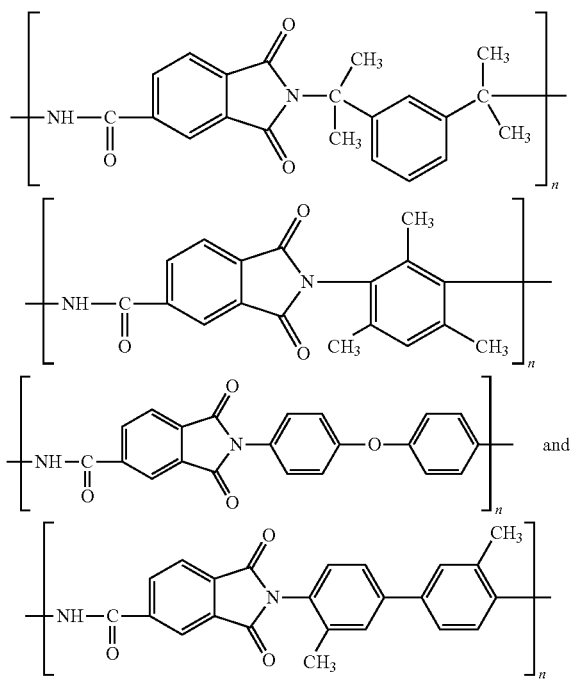

where n represents the number of repeating segments, and is, for example, as illustrated herein, such as n being a number of from about 20 to about 1,000, from about 100 to about 700, from about 100 to about 500, or from about 275 to about 400.

In embodiments, the polyamideimides, such as those commercially available from Toyobo Company, can, it is believed, be synthesized by at least the following two known methods: (1) the isocyanate method, which involves the reaction between an isocyanate and a trimellitic anhydride; or (2) the acid chloride method, where there is reacted a diamine and a trimellitic anhydride chloride.

Polyamideimide homopolymers, polyamideimide copolymers, and their blends can also be included in the intermediate transfer member mixtures disclosed herein.

Commercially available or obtainable examples of polyamideimides (PAI) include VYLOMAX® HR-11NN (15 weight percent solution in N-methylpyrrolidone, $T_g$ (glass transition temperature) of about 300° C., and a weight average molecular weight ($M_w$) of about 45,000), HR-12N2 (30 weight percent solution in N-methylpyrrolidone/xylene/methyl ethyl ketone, 50/35/15 weight ratio, $T_g$ of 255° C., and $M_w$ of 8,000), HR-13NX (30 weight percent solution in N-methylpyrrolidone/xylene, 67/33, $T_g$ of 280° C., and $M_w$ of 10,000), HR-15ET (25 weight percent solution in ethanol/toluene, 50/50, $T_g$ of 260° C., and $M_w$ of 10,000), HR-16NN (14 weight percent solution in N-methylpyrrolidone, $T_g$ of 320° C., and $M_w$ of 100,000), and HR-66NN (13 weight percent solution in N-methylpyrrolidone, $T_g$ of 340° C.), all commercially available from Toyobo Company of Japan, and TORLON® AI-10 ($T_g$ of 272° C.), commercially available from Solvay Advanced Polymers, LLC, Alpharetta, Ga.

The polyamideimide can be present in the disclosed mixtures, and in the intermediate transfer films formed therefrom in various effective amounts, such as for example, from about 50 to about 95 weight percent, from about 75 to about 90 weight percent, from about 70 to about 95 weight percent, from about 70 to about 80 weight percent, from about 65 to about 95 weight percent, or from about 75 to about 85 weight percent, based on the total of solids, ingredients, or components present in the coating solution.

Ammonium Alkylphosphates

The intermediate transfer members herein also comprise an ammonium alkylphosphate additive mixed or dispersed in the polyamideimide polymer. A benefit of the use of an ammonium alkylphosphate, as compared to other additives, is that the resultant mixture is stable with minimum or no degradation for up to about 2 years. That is, properties of the mixture, such as dispersion stability and self-release after curing, remain the same or substantially the same at a time of up to one month, up to two months, up to one year (twelve months), or even up to two years after preparation, as compared to the similar properties immediately upon preparation. Thus, the mixture prior to curing is stable with substantially no degradation during such storage.

The ammonium alkylphosphates, which primarily function as an internal release additive, included in the intermediate transfer coating solution or mixture are available from a number of companies, such as R.T. Vanderbilt Co., Inc., Norwalk, Conn. and Rhein Chemie Corp., Trenton, N.J.

Examples of ammonium alkylphosphates selected for the intermediate transfer member mixtures or coating solutions disclosed herein are those as represented by the following formulas/structures 1 or 2,

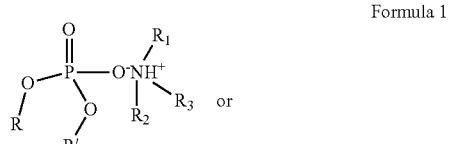

Formula 1

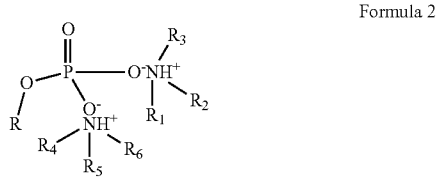

Formula 2 wherein R and R' each independently represents an alkyl with, for example, from about 1 to about 12 carbon atoms, from 1 to about 10 carbon atoms, from about 2 to about 5 carbon atoms, or from 1 to about 6 carbon atoms, and $R_1$, $R_2$, $R_3$, $R_4$, $R_5$ and $R_6$ each independently represents an alkyl with, for example, from about 1 to about 30 carbon atoms, from about 8 to about 24 carbon atoms, from about 8 to about 16 carbon atoms, from about 6 to about 24 carbon atoms, from about 10 to about 18 carbon atoms, or from about 10 to about 15 carbon atoms, and branched alkyls with from about 1 to about 30 carbon atoms, from about 10 to about 25 carbon atoms, from about 10 to about 15 carbon atoms, or from about 15 to about 20 carbon atoms.

Examples of the ammonium alkylphosphate alkyl substituents are methyl, ethyl, propyl, butyl, pentyl, hexyl, heptyl, octyl, nonyl, decyl, pentadecyl, dodecyl, and the like.

Specific examples of the ammonium alkylphosphates present in the mixtures disclosed herein can be represented by one of the following formulas/structures

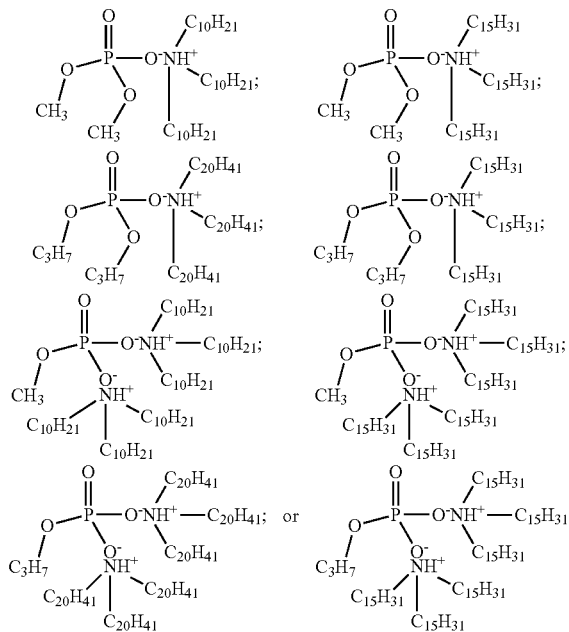

and the like, and mixtures thereof.

The ammonium alkylphosphates can be present in the disclosed mixtures and in the intermediate transfer films formed in various effective amounts, such as for example, from about 0.05 to about 10 weight percent, from about 0.1 to about 5 weight percent, from about 0.1 to about 4 weight percent, from about 0.5 to about 4 weight percent, from about 0.1 to about 3 weight percent, from about 0.7 to about 3 weight percent, or less than 2 weight percent, based on the total of ingredients or components present in the coating solution mixture.

Optional Polysiloxane Polymers

The disclosed intermediate transfer member mixtures can also include an optional polysiloxane polymer. Examples of polysiloxane polymers selected for the intermediate transfer member mixture disclosed herein include known suitable polysiloxanes, such as a polyether modified (copolymer) polydimethylsiloxane, commercially available from BYK Chemical as BYK®333, BYK®330 (about 51 weight percent in methoxypropylacetate), and BYK 344 (about 52.3 weight percent in xylene/isobutanol, ratio of 80/20); BYK®-SILCLEAN 3710 and BYK 3720 (about 25 weight percent in methoxypropanol); a polyester modified polydimethylsiloxane, commercially available from BYK Chemical as BYK®310 (about 25 weight percent in xylene) and BYK 370 (about 25 weight percent in xylene/alkylbenzene/cyclohexanone/monophenylglycol, ratio of 75/11/7/7), a polyacrylate modified polydimethylsiloxane, commercially available from BYK Chemical as BYK®-SILCLEAN 3700 (about 25 weight percent in methoxypropylacetate), a polyester polyether modified (copolymer) polydimethylsiloxane, commercially available from BYK Chemical as BYK®375 (about 25 weight percent in di-propylene glycol monomethyl ether), and the like, and mixtures thereof.

The polysiloxane polymer, or copolymers thereof can be present in the disclosed intermediate transfer thermoplastic mixtures in various effective amounts, such as from about 0.01 to about 1 weight percent, from about 0.05 to about 1 weight percent, from about 0.05 to about 0.5 weight percent, from about 0.1 to about 0.3 weight percent, or less than about 0.1 weight percent based on the total solids, and with the total of ingredients in the mixtures being about 100 percent.

Optional Fillers

Optionally, the intermediate transfer member mixtures may contain one or more fillers to, for example, alter and adjust the conductivity of the intermediate transfer member. When the intermediate transfer member is a one layer structure, the conductive filler can be included in the mixtures disclosed herein. When the intermediate transfer member is a multi-layer structure, the conductive filler can be included in the disclosed mixtures or one or more layers of the member like the supporting substrate, and in both the supporting substrate and in the layer thereover generated from the mixtures illustrated herein.

Any suitable filler can be used that provides the desired results. For example, suitable fillers include carbon blacks, metal oxides, polyanilines, other known fillers, and mixtures of fillers.

Examples of carbon black fillers that can be selected for the intermediate disclosed transfer member mixtures and disclosed intermediate transfer members, and where the particle sizes can be determined by an electron microscope and the B. E. T. surface areas can be determined by the standard known one point nitrogen gas physisorption method, include special black 4 (B.E.T. surface area=180 $m^2/g$, DBP absorption=1.8 ml/g, primary particle diameter=25 nanometers) available from Evonik-Degussa, special black 5 (B.E.T. surface area=240 $m^2/g$, DBP absorption=1.41 ml/g, primary particle diameter=20 nanometers), color black FW1 (B.E.T. surface area=320 $m^2/g$, DBP absorption=2.89 ml/g, primary particle diameter=13 nanometers), color black FW2 (B.E.T. surface area=460 $m^2/g$, DBP absorption=4.82 ml/g, primary particle diameter=13 nanometers), color black FW200 (B.E.T. surface area=460 $m^2/g$, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 $m^2/g$, DBP absorption=1.05 ml/g), BLACK PEARLS® 880 (B.E.T. surface area=240 $m^2/g$, DBP absorption=1.06 ml/g), BLACK PEARLS® 800 (B.E.T. surface area=230 $m^2/g$, DBP absorption=0.68 ml/g), BLACK PEARLS® L (B.E.T. surface area=138 $m^2/g$, DBP absorption=0.61 ml/g), BLACK PEARLS® 570 (B.E.T. surface area=110 $m^2/g$, DBP absorption=1.14 ml/g), BLACK PEARLS® 170 (B.E.T. surface area=35 $m^2/g$, DBP absorption=1.22 ml/g), VULCAN® XC72 (B.E.T. surface area=254 $m^2/g$, DBP absorption=1.76 ml/g), VULCAN® XC72R (fluffy form of VULCAN® XC72), VULCAN® XC605, VULCAN® XC305, REGAL® 660 (B.E.T. surface area=112 $m^2/g$, DBP absorption=0.59 ml/g), REGAL® 400 (B.E.T. surface area=96 $m^2/g$, DBP absorption=0.69 ml/g), REGAL® 330 (B.E.T. surface area=94 $m^2/g$, DBP absorption=0.71 ml/g), MONARCH® 880 (B.E.T. surface area=220 $m^2/g$, DBP absorption=1.05 ml/g, primary particle diameter=16 nanometers), and MONARCH® 1000 (B.E.T. surface area=343 $m^2/g$, DBP absorption=1.05 ml/g, primary particle diameter=16 nanometers); and Channel carbon blacks available from Evonik-Degussa. Other known suitable carbon blacks not specifically disclosed herein may be selected as the filler or conductive component for the intermediate transfer mixtures and members disclosed herein.

Examples of polyaniline fillers that can be selected for incorporation into the disclosed intermediate transfer mixtures and resulting members thereof are PANIPOL™ F, commercially available from Panipol Oy, Finland, and known lignosulfonic acid grafted polyanilines. These polyanilines, it is believed, usually have a relatively small particle size diameter of, for example, from about 0.5 to about 5 microns; from about 1.1 to about 2.3 microns; or from about 1.5 to about 1.9 microns.

Metal oxide fillers that can be selected for the disclosed intermediate transfer mixtures and members generated therefrom include, for example, tin oxide, antimony doped tin oxide, indium oxide, indium tin oxide, zinc oxide, and titanium oxide, and the like.

When present, the filler can be selected in an amount of, for example, from about 1 to about 60 weight percent, from about 1 to about 30 weight percent, from about 3 to about 40 weight percent, from about 4 to about 30 weight percent, from about 10 to about 30 percent, or from about 5 to about 20 weight percent based on the total solids.

Optional Additional Polymers

In embodiments of the present disclosure, the intermediate transfer member mixture can further include an optional polymer that primarily functions as a binder. Examples of suitable additional polymers include a polyamideimide, a polycarbonate, a poly(phenylene sulfide), a polyamide, a polysulfone, a polyetherimide, a polyester, a polyvinylidene fluoride, a polyethylene-co-polytetrafluoroethylene, and the like, and mixtures thereof.

When an additional polymer is selected, it can be included in the intermediate transfer member mixture in any desirable and effective amounts. For example, the additional polymer can be present in an amount of from about 1 to about 75 weight percent, from about 2 to about 45, or from about 3 to about 15 weight percent, based on the total solids.

Optional Supporting Substrates

If desired, a supporting substrate can be included in the intermediate transfer member, such as beneath the layer resulting from the coating mixtures illustrated herein. The supporting substrate can be included to provide increased rigidity or strength to the intermediate transfer member.

The disclosed polyamideimide, ammonium alkylphosphate, optional filler, and optional polymers mixtures, or the coating dispersions thereof can be formed on any suitable supporting substrate material after being self-released from, for example, a stainless steel substrate to form the intermediate transfer member. Exemplary supporting substrate materials include polyimides, polyamideimides, polyetherimides, mixtures thereof, and the like.

More specifically, examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, and the like The thermosetting polyimides can be cured at temperatures of from about 180° C. to about 260° C. over a short period of time, such as from about 10 to about 120 minutes, or from about 20 to about 60 minutes, and generally have a number average molecular weight of from about 5,000 to about 500,000 or from about 10,000 to about 100,000, and a weight average molecular weight of from about 50,000 to about 5,000,000 or from about 100,000 to about 1,000,000. Also, for the supporting substrate there can be selected thermosetting polyimides that can be cured at temperatures of above 300° C., such as PYRE M.L.® RC-5019, RC-5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates for the intermediate transfer members disclosed herein are VYLOMAX® HR-11NN (15 weight percent solution in N-methylpyrrolidone, $T_g=300°$ C., and $M_w=45,000$), HR-12N2 (30 weight percent solution in N-methylpyrrolidone/xylene/methyl ethyl ketone=50/35/15, $T_g=255°$ C., and $M_w=8,000$), HR-13NX (30 weight percent solution in N-methylpyrrolidone/xylene=67/33, $T_g=280°$ C., and $M_w=10,000$), HR-15ET (25 weight percent solution in ethanol/toluene=50/50, $T_g=260°$ C., and $M_w=10,000$), HR-16NN (14 weight percent solution in N-methylpyrrolidone, $T_g=320°$ C., and $M_w=100,000$), all commercially available from Toyobo Company of Japan, and TORLON® AI-10 ($T_g=272°$ C.), commercially available from Solvay Advanced Polymers, LLC, Alpharetta, Ga.

Examples of specific polyetherimide supporting substrates that can be selected for the intermediate transfer members disclosed herein are ULTEM® 1000 ($T_g=210°$ C.), 1010 ($T_g=217°$ C.), 1100 ($T_g=217°$ C.), 1285, 2100 ($T_g=217°$ C.), 2200 ($T_g=217°$ C.), 2210 ($T_g=217°$ C.), 2212 ($T_g=217°$ C.), 2300 ($T_g=217°$ C.), 2310 ($T_g=217°$ C.), 2312 ($T_g=217°$ C.), 2313 ($T_g=217°$ C.), 2400 ($T_g=217°$ C.), 2410 ($T_g=217°$ C.), 3451 ($T_g=217°$ C.), 3452 ($T_g=217°$ C.), 4000 ($T_g=217°$ C.), 4001 ($T_g=217°$ C.), 4002 ($T_g=217°$ C.), 4211 ($T_g=217°$ C.), 8015, 9011 ($T_g=217°$ C.), 9075, and 9076, all commercially available from Sabic Innovative Plastics.

Once formed, the supporting substrate can have any desired and suitable thickness. For example, the supporting substrate can have a thickness of from about 10 to about 300 microns, from about 50 to about 150 microns, or from about 75 to about 125 microns as measured by known methods, such as an electron microscope.

Optional Release Layer

If desired, an optional release layer can be further included in the disclosed intermediate transfer members, such as over the layer formed from the mixtures illustrated herein. The release layer material can assist in providing efficient toner residual cleaning, and additional effective developed image transfer efficiency from a photoconductor to the intermediate transfer member.

When selected, the release layer can have any desired and suitable thickness. For example, the release layer can have a thickness of from about 1 to about 100 microns, about 10 to about 75 microns, or from about 20 to about 50 microns.

The optional release layer material can comprise TEFLON®-like materials including fluorinated ethylene propylene copolymer (FEP), polytetrafluoroethylene (PTFE), polyfluoroalkoxy polytetrafluoroethylene (PFA TEFLON®), and other TEFLON®-like materials; silicone materials, such as fluorosilicones, and silicone rubbers, such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, and VITON GF®. The VITON® designation is a Trademark of E.I. DuPont de Nemours, Inc. Two known fluoroelastomers selected for the release layer are comprised of (1) a class of copolymers of vinylidenefluoride, hexafluoropropylene, and tetrafluoroethylene, commercially available as VITONA®; (2) a class of terpolymers of vinylidenefluoride, hexafluoropropylene, and tetrafluoroethylene, commercially available as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomers can be those available from E.I. DuPont de Nemours, Inc. such as 4-bromoperfluorobutene-1, 1,1-dihydro-4-bromoperfluorobutene-1,3-bromoperfluoropropene-1, 1,1-dihydro-3-bromoperfluoropropene-1, or any other suitable, known, commercially available cure site monomer.

Intermediate Transfer Member Formation

The intermediate transfer members illustrated herein can be prepared, for example, by known milling processes, and where uniform dispersions of the disclosed intermediate transfer member mixtures can be obtained, and then coated on individual metal substrates, such as a stainless steel substrate or the like, using known draw bar coating or flow coating methods. The resulting individual film or films can be dried at high temperatures, such as by heating the films at from about 100 to about 400° C., or from about 160 to about 300° C., for a suitable period of time, such as from about 20 to about 240 minutes, or from about 40 to about 180 minutes, while remaining on the substrates. After drying and cooling to room temperature, about 23 to about 25° C., the films obtained self release from the steel substrates without any external assistance. The resultant intermediate transfer film product can have a thickness of, for example, from about 15 to about 150 microns, from about 20 to about 100 microns, or from about 25 to about 80 microns.

As metal substrates selected for the deposition of the polyamideimide and alkylphosphate mixtures disclosed herein, there can be used stainless steel, aluminum, nickel, copper, and their alloys, glass plates, and other conventional typical known materials.

Examples of solvents selected for formation of the intermediate transfer member mixtures, which solvents can be selected in an amount of, for example, from about 60 to about 95 weight percent, or from about 70 to about 90 weight percent of the total mixture components weight include alkylene halides, such as methylene chloride, tetrahydrofuran, toluene, monochlorobenzene, N-methyl-2-pyrrolidone (NMP), N,N-dimethylformamide, N,N-dimethylacetamide, methyl ethyl ketone, dimethylsulfoxide (DMSO), methyl isobutyl ketone, formamide, acetone, ethyl acetate, cyclohexanone, acetanilide, mixtures thereof, and the like. Diluents can be mixed with the solvents selected for the intermediate transfer member mixtures. Examples of diluents added to the solvents in amounts of from about 1 to about 25 weight percent, and from 1 to about 10 weight percent, based on the weight of the solvent and the diluent are known diluents like aromatic hydrocarbons, ethyl acetate, acetone, cyclohexanone and acetanilide.

The intermediate transfer members illustrated herein can be selected for a number of printing and copying systems, inclusive of xerographic printing systems. For example, the disclosed intermediate transfer members can be incorporated into a multi-imaging xerographic machine where each developed toner image to be transferred is formed on the imaging or photoconductive drum at an image forming station, and where each of these images is then developed at a developing station, and transferred to the intermediate transfer member. The images may be formed on a photoconductor and developed sequentially, and then transferred to the intermediate transfer member. In an alternative method, each image may be formed on the photoconductor or photoreceptor drum, developed, and then transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

Specific embodiments will now be described in detail. These examples are intended to be illustrative, and are not limited to the materials, conditions, or process parameters set forth in these embodiments. All parts are percentages by weight of total solids of all the components unless otherwise indicated. The viscosity values were determined by a viscometer.

EXAMPLE I

Two tenths (0.2) weight percent of the ammonium alkylphosphate as obtained from R.T. Vanderbilt Co., Inc., Norwalk, Conn. of Formula 1, as illustrated herein, and where R and R' are methyl, and $R_1$, $R_2$, and $R_3$ are a branched alkyl with 10 carbon atom, was mixed with 84.7 weight percent of the polyamideimide, VYLOMAX®1-R-11NN (15 weight percent solids in N-methylpyrrolidone, polyamideimide $T_g$=300° C., with a weight average molecular weight, $M_w$=45,000) as obtained from the Toyobo Company, 15 weight percent of the carbon black special carbon black SB-4 (B.E.T. surface area=180 $m^2$/g, DBP absorption=1.8 ml/g, primary particle diameter=25 nanometers) as obtained from DeGussa Chemicals, and 0.1 weight percent of a copolymer of a polyester and a polysiloxane copolymer (BYK® 310) was prepared by ball milling the resulting mixture with 2 millimeter stainless shot in an Attritor for a period of 6 hours.

The final composition of the above PAI/carbon black/ammonium alkylphosphate/polysiloxane copolymer weight ratio was 84.7/15/0.2/0.1.

The above resulting dispersion was then coated on a stainless steel substrate of a thickness of 0.5 millimeter using a known draw bar coating method and subsequently dried at 120° C. for 30 minutes, and then dried at 160° C. for an additional 60 minutes while remaining on the steel substrate.

The resulting dried coating self released instantly and within about 4 seconds, with no outside aids or tools, from the stainless steel substrate. An about 100 micron thick intermediate transfer member film that was in a flat orientation and with no curl resulted where the weight ratio of the PAI/carbon black/ammonium alkylphosphate/polysiloxane copolymer was 84.7/15/0.2/0.1 based on the above initial mixture feed amounts.

The above coating dispersion was stored or aged for one month in a covered flask in a dark room with no light, without any gradual decomposition or degradation as evidenced by the film properly curing and self releasing from the stainless steel substrate prior to forming the intermediate transfer film. The formed intermediate transfer film coated from the aged coating dispersion self released in about 5 seconds from the substrate as effectively as that coated from the above fresh coating dispersion which released in about 4 seconds.

EXAMPLE II

An intermediate transfer member film was prepared by repeating the process of Example I except that the ammonium alkylphosphate selected was obtained from Rhein Chemie Corp., Trenton, N.J. of Formula 2 as illustrated herein, where R is propyl, and $R_1$, $R_2$, $R_3$, $R_4$, $R_5$, and $R_6$ are a branched alkyl with 20 carbon atoms, resulting in substantially similar self-release characteristics and no gradual degradation of the coating dispersion after being stored for one month.

COMPARATIVE EXAMPLE 1

A coating composition was prepared by repeating the process of Example I with the exception that the ammonium alkylphosphate was not included in the mixture, and where the weight ratio of the PAI/carbon black/polysiloxane copolymer was 84.7/15/0.3 based on the above initial mixture feed amounts.

The obtained intermediate transfer member dispersion was coated on a stainless steel substrate of a thickness of 0.5 millimeter, and subsequently the mixture was cured by heating at 120° C. for 30 minutes, and 160° C. for 60 minutes. The resulting intermediate transfer member, about 80 microns in thickness, comprised of the above components in the ratios indicated did not self release from the stainless substrate, but rather adhered to this substrate. After being immersed in water for 2 months, the intermediate transfer member obtained eventually self released from the substrate.

COMPARATIVE EXAMPLE 2

A coating composition was prepared by repeating the process of Example I with the exception that the ammonium alkylphosphate was replaced with POLYSTEP® P-34, a nonylphenol ethoxylate phosphate ester with an average mole number of ethoxy of about 10, available from STEPAN Company, Northfield, Ill., and where the weight ratio of the PAI/carbon black/phosphate ester/polysiloxane copolymer was 84.7/15/0.2/0.1 based on the above initial mixture feed amounts.

The intermediate transfer film coated from the above fresh coating dispersion self released within about 4 seconds, with no outside aids or tools, from the stainless steel substrate, and an about 100 micron thick intermediate transfer member film that was in a flat orientation and with no curl resulted.

However, after the above fresh coating dispersion was stored or aged for one month in a covered flask in a dark room with no light, the intermediate film coated from the aged coating dispersion did not self release from the substrate. The above phosphate ester release agent present in the mixture in addition to decomposing gradually became ineffective with aging.

MEASUREMENTS

The above intermediate transfer members (ITM) of Comparative Examples 1 and 2, and Examples I and II, were measured for Young's modulus and resistivity. The measurement results are provided in the following Table 1.

The Young's modulus was measured by following the known ASTM D882-97 process where samples (0.5 inch×12 inch) of each intermediate transfer member were placed in the Instron Tensile Tester measurement apparatus, and then the samples were elongated at a constant pull rate until breaking. During this time, there was recorded the resulting load versus the sample elongation. The Young's Modulus was calculated by taking any point tangential to the initial linear portion of the recorded curve results and dividing the tensile stress by the corresponding strain. The tensile stress was calculated by the load divided by the average cross sectional area of each of the test samples.

The surface resistivity of the above intermediate transfer members of Comparative Examples 1 and 2, and Examples I and II were measured using a High Resistivity Meter, and the results are provided in Table 1.

TABLE 1

| | Surface Resistivity (ohm/sq) | Young's Modulus (MPa) | ITB Release From Metal Substrate |
|---|---|---|---|
| Example I, Coated from the Fresh Dispersion | $2.2 \times 10^{10}$ | 4,800 | Self Released in 4 Seconds |
| Example I, Coated from the 1 Month Aged Dispersion | $2.5 \times 10^{10}$ | 4,800 | Self Released in 4 Seconds |
| Example II, Coated from the Fresh Dispersion | $4.2 \times 10^{10}$ | 4,700 | Self Released in 4 Seconds |
| Example II, Coated from the 1 Month Aged Dispersion | $4.7 \times 10^{10}$ | 4,700 | Self Released in 4 Seconds |
| Comparative Example 1 | $3.4 \times 10^{10}$ | 4,600 | Did Not Self Release |
| Comparative Example 2, Coated from the Fresh Dispersion | $4.7 \times 10^{10}$ | 4,800 | Self Released in 4 Seconds |
| Comparative Example 2, Coated from the 1 Month Aged Dispersion | $5.1 \times 10^{10}$ | 4,800 | Did Not Self Release |

After being released from the stainless steel substrates, the Example I and Example II films obtained can be used as intermediate transfer members. Also, the Example I and Example II films obtained can be laminated or deposited on respective supporting substrates of a polymer like a polyimide.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of a mixture of a conductive filler component, a polyamideimide polymer, an ammonium alkylphosphate and a polysiloxane, and which conductive filler component is carbon black, wherein said ammonium alkylphosphate is represented by the following formulas/structures

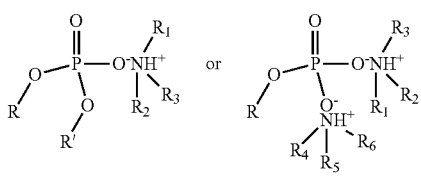

wherein R and R', $R_1$, $R_2$, $R_3$, $R_4$, $R_5$ and $R_6$ each independently represents an alkyl substituent and wherein R and R' each contains from 1 to about 10 carbon atoms, and wherein each of $R_1$, $R_2$, $R_3$, $R_4$, $R_5$ and $R_6$ contains from about 10 to about 30 carbon atoms.

2. The intermediate transfer member in accordance with claim 1 wherein said polyamideimide polymer is represented by the following formulas/structures

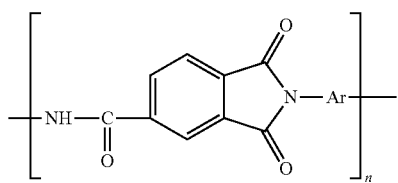

wherein Ar is aryl, and n represents a number of repeating segments, and is from about 20 to about 1,000.

3. The intermediate transfer member in accordance with claim 2 wherein said aryl contains from 6 to about 18 carbon atoms.

4. The intermediate transfer member in accordance with claim 1 wherein said polyamideimide polymer is represented by at least one of the following formulas/structures

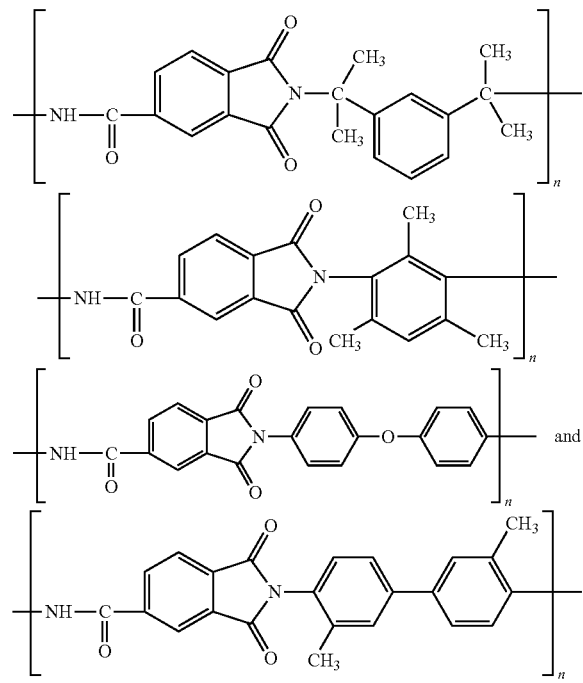

where n is a number of from about 100 to about 500.

5. The intermediate transfer member in accordance with claim 1 wherein said polyamideimide polymer is present in an amount of from about 65 to about 95 weight percent based on the total of ingredients in said mixture being about 100 percent, and wherein said mixture is cured.

6. The intermediate transfer member in accordance with claim 1 wherein said polyamideimide polymer is present in an amount of from about 75 to about 90 weight percent based on the total of ingredients in said mixture being about 100 percent.

7. The intermediate transfer member in accordance with claim 1 wherein for each ingredient of said mixture, the polyamideimide polymer is present in an amount of from about 70 to about 95 weight percent, the ammonium alkylphosphate is present in an amount of from about 0.1 to about 3 weight percent, the polysiloxane is present in an amount of from about 0.05 to about 1 weight percent, and the conductive filler component is present in an amount of from about 1 to about 30 weight percent, with the total of ingredients being about 100 percent, and which member has a Young's Modulus of from about 4,800 to about 5,500 Mega Pascals (MPa), and a coefficient of thermal expansion as determined by Thermo-Mechanical Analysis of from about 20 to about 70 parts per million per degree Kelvin (ppm/° K).

8. The intermediate transfer member in accordance with claim 1 wherein said polysiloxane is a copolymer of a polyether and a polydimethylsiloxane, a copolymer of a polyester and a polydimethylsiloxane, a copolymer of a polyacrylate and a polydimethylsiloxane, or a copolymer of a polyester polyether and a polydimethylsiloxane, and which member has a Young's Modulus of from about 4,000 to about 8,000 Mega Pascals.

9. The intermediate transfer member in accordance with claim 1 wherein said mixture is stable with substantially no degradation subsequent to being stored for twelve months.

10. The intermediate transfer member in accordance with claim 1 wherein there is deposited on said mixture a layer of a material selected from the group consisting of a fluorinated ethylene propylene copolymer, a polytetrafluoroethylene, a polyfluoroalkoxy polytetrafluoroethylene, a fluorosilicone, a terpolymer of vinylidene fluoride, hexafluoropropylene, and tetrafluoroethylene, and mixtures thereof.

11. The intermediate transfer member in accordance with claim 1 wherein $R_1$, $R_2$, $R_3$, $R_4$, $R_5$, and $R_6$ are each a branched alkyl with from about 15 to about 20 carbon atoms.

12. The intermediate transfer member in accordance with claim 1 wherein said ammonium alkylphosphate, present in an amount of from about 0.05 to about 10 weight percent based on the total of ingredients in said mixture being about 100 percent, is represented by the following formulas/structures

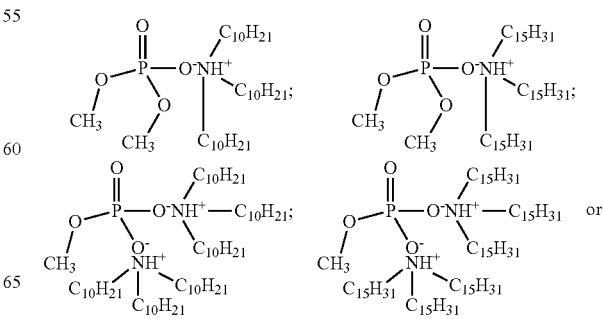

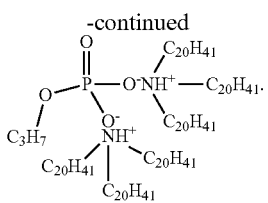

13. The intermediate transfer member in accordance with claim 1 wherein said ammonium alkylphosphate is present in an amount of from about 0.1 to about 4 weight percent based on the total of ingredients in said mixture being about 100 percent.

14. An intermediate transfer member consisting of a mixture of a polyamideimide polymer, an ammonium alkylphosphate, a polysiloxane, and a conductive filler component, and wherein said ammonium alkylphosphate is represented by the following formulas/structures

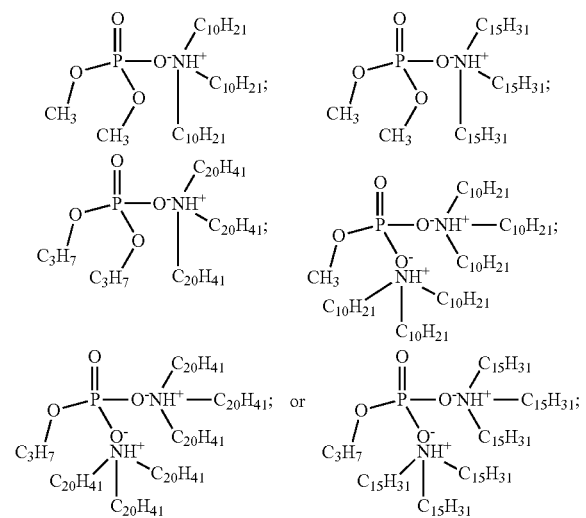

and wherein said intermediate transfer member contains thereon a toner developed xerographic image originating from a photoconductor, and which developed image is transferred to an image receiving substrate; and wherein said polyamideimide polymer is represented by at least one of the following formulas/structures

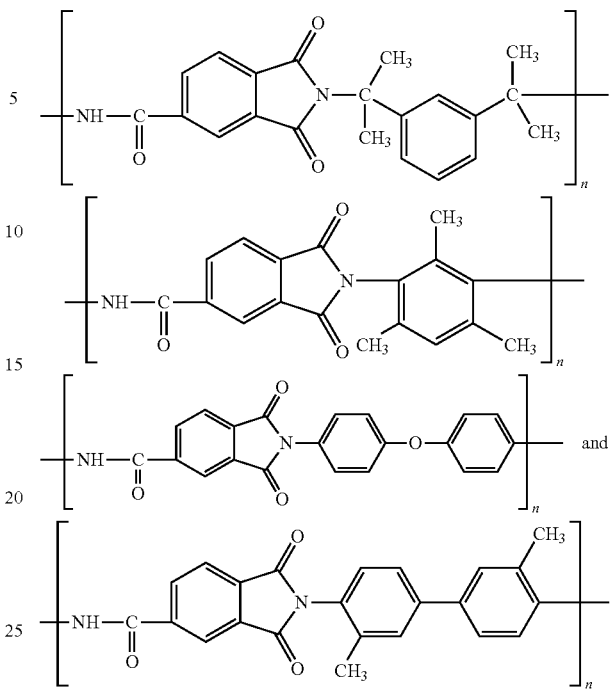

where n is a number of from about 100 to about 500, and optionally wherein from about 90 to about 100 percent of said intermediate transfer member self releases from substrates.

15. A xerographic intermediate transfer member consisting of a polyamideimide polymer, an ammonium alkylphosphate and a conductive filler component, and wherein said ammonium alkylphosphate is represented by one of the following formulas/structures

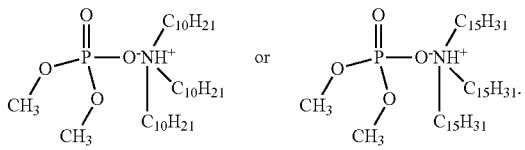

* * * * *